(12) United States Patent
Gopinath et al.

(10) Patent No.: US 11,107,048 B2
(45) Date of Patent: Aug. 31, 2021

(54) PROVIDING OUT-OF-BAND VERIFICATION FOR BLOCKCHAIN TRANSACTIONS

(71) Applicant: International Business Machines Corporation, Armonk, NY (US)

(72) Inventors: Ramesh Gopinath, Millwood, NY (US); Lawrence Koved, Pleasantville, NY (US); Brigid Mcdermott, New York, NY (US); Krishna Ratakonda, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 15/489,552

(22) Filed: Apr. 17, 2017

(65) Prior Publication Data

US 2018/0300693 A1 Oct. 18, 2018

(51) Int. Cl.
| | |
|---|---|
| *G06Q 40/00* | (2012.01) |
| *G06Q 20/06* | (2012.01) |
| *G06Q 20/40* | (2012.01) |
| *H04L 9/32* | (2006.01) |

(52) U.S. Cl.
CPC ......... *G06Q 20/065* (2013.01); *G06Q 20/401* (2013.01); *G06Q 20/4016* (2013.01); *H04L 9/3228* (2013.01); *H04L 9/3236* (2013.01); *H04L 2209/38* (2013.01); *H04L 2209/56* (2013.01)

(58) Field of Classification Search
CPC .............. G06Q 20/065; G06Q 20/401; G06Q 20/4016; H04L 9/3228; H04L 9/3236; H04L 2209/38; H04L 2209/56
See application file for complete search history.

(56) References Cited

U.S. PATENT DOCUMENTS

| | | | |
|---|---|---|---|
| 10,169,937 B1* | 1/2019 | Zwink | G07C 9/00039 |
| 2014/0283113 A1 | 9/2014 | Hanna | |
| 2016/0028552 A1 | 1/2016 | Spanos et al. | |
| 2016/0080156 A1 | 3/2016 | Kaliski, Jr. | |
| 2016/0191243 A1* | 6/2016 | Manning | H04L 61/1511 713/168 |
| 2016/0330034 A1* | 11/2016 | Back | G06Q 20/06 |
| 2017/0046698 A1* | 2/2017 | Haldenby | G06Q 20/0655 |
| 2017/0134937 A1* | 5/2017 | Miller | G06Q 20/3829 |
| 2017/0155515 A1* | 6/2017 | Androulaki | G06F 21/64 |
| 2018/0068130 A1* | 3/2018 | Chan | G06F 21/6227 |
| 2018/0097635 A1* | 4/2018 | Moses | H04L 9/0637 |

(Continued)

FOREIGN PATENT DOCUMENTS

| | | |
|---|---|---|
| WO | 2015052676 A1 | 4/2015 |
| WO | 2016063092 A1 | 4/2016 |

OTHER PUBLICATIONS

Payments Get Real Wright, Gilly. Global Finance; New York vol. 31, Iss. 4, (Apr. 2017): 54-55. (Year: 2017).*

(Continued)

*Primary Examiner* — Lalita M Hamilton

(57) ABSTRACT

An example operation may include one or more of receiving one or more transaction requests to complete one or more transactions, recording the one or more transaction requests in a blockchain, requesting one or more transaction confirmations from an out-of-band device to confirm the one or more transactions, and committing the one or more confirmed transactions to the blockchain.

9 Claims, 6 Drawing Sheets

(56) References Cited

U.S. PATENT DOCUMENTS

2018/0123804 A1* 5/2018 Smith .................. H04W 76/10
2018/0189878 A1* 7/2018 Uhr ....................... G06Q 40/04
2018/0205682 A1* 7/2018 O'Brien, V .......... G03H 1/0005

OTHER PUBLICATIONS

Anonymously; Mechanism to Preserve Audit History Record for Insurance Claim Using Blockchain Smart Contract; Aug. 5, 2016.
Anonymously; Method and System for Detecting Possible Fraud in a Transaction, Jan. 18, 2016.
Anonymously; Method and System for Clear Identification of Identity in Transactions, Dec. 7, 2010.

* cited by examiner

400

PROVIDING OUT-OF-BAND VERIFICATION FOR BLOCKCHAIN TRANSACTIONS

TECHNICAL FIELD

This application generally relates to fraud prevention, and more particularly, to providing out-of-band verification for blockchain transactions.

BACKGROUND

Transactional systems, especially financial systems, are constantly under attack by fraudulent parties. While it is often difficult to compromise core financial systems, hackers often work around the periphery seeking to obtain authentication credentials and access to the systems that originate and/or terminate those transactions. Should a transaction endpoint become compromised, it is possible to place financial transactions with the core financial system that appear to be legitimate. It is also possible for the hacker to modify a recording of such transactions so that the originating financial institution will remain unaware of the fraudulent transactions until notified by a third party. The financial cost and reputation to both the originating financial institution and financial systems is high.

Currently, there are a variety of two-factor authentication devices and software available from multiple vendors. One of the best known is the RSA 2-Factor authentication token which generates random numbers. This random number is used as an authentication factor in addition to a user ID/password. Vendors have started to use mobile devices (e.g., cell phones, smart phones, tablets) and email accounts to perform two-factor authentication. Blockchain technology has the ability to support a decentralized multi-party permanent record of a set of events. Both permissionless blockchains where anonymous participants record events (e.g., transfer cryptocurrency between parties), or a permissioned blockchain can be used. Permissioned blockchains are intended for communication of events where the parties have at least a minimal level of mutual trust, and events of interest to two or more parties can be recorded in a public fashion. While the events are public, cryptographic technologies can be used to limit the disclosure of the details of the events posted to the blockchain. The disclosure can be limited to pairwise parties or it can be multi-party. Some permissioned blockchains, such as a distributed ledger, have a concept of an "audit" function, where a third party may verify various transactions on the blockchain even when the transactions recorded in the blockchain are encrypted. Mathematical modeling can be used to perform behavior modeling and detect anomalous events in a stream of transactions. This is often used in a variety of financial channels, including ATM, debit/credit cards, ACH, checking and wire transfers. Many mathematical modeling techniques have been employed including SVM, logistic regression, decision trees, neural networks, etc. However, verification of transactions must still be performed to reduce the likelihood of fraud.

SUMMARY

One example embodiment may include a method that includes one or more of receiving one or more transaction requests to complete one or more transactions, recording the one or more transaction requests in a blockchain, requesting one or more confirmations from an out-of-band device to confirm the one or more transactions, and committing the one or more transactions to the blockchain.

Another example embodiment may include a method that includes one or more of receiving one or more transaction requests to complete one or more transactions, recording the one or more transaction requests in a blockchain, signing the one or more transactions via a one-time use signature scheme comprising a private key and a one-time public key via an out-of-band device, and committing the one or more transactions to the blockchain.

Another example embodiment may include an apparatus that includes one or more of a receiver configured to receive one or more transaction requests to complete one or more transactions, and a processor configured to record the one or more transaction requests in a blockchain, request one or more transaction confirmations from an out-of-band device to confirm the one or more transactions, and commit the one or more confirmed transactions to the blockchain.

Yet a further example embodiment may include a non-transitory computer readable storage medium configured to store instructions that when executed cause a processor to perform one or more of receiving one or more transaction requests to complete one or more transactions, recording the one or more transaction requests in a blockchain, requesting one or more confirmations from an out-of-band device to confirm the one or more transactions, and committing the one or more transactions to the blockchain.

DETAILED DESCRIPTION

Figure 1:
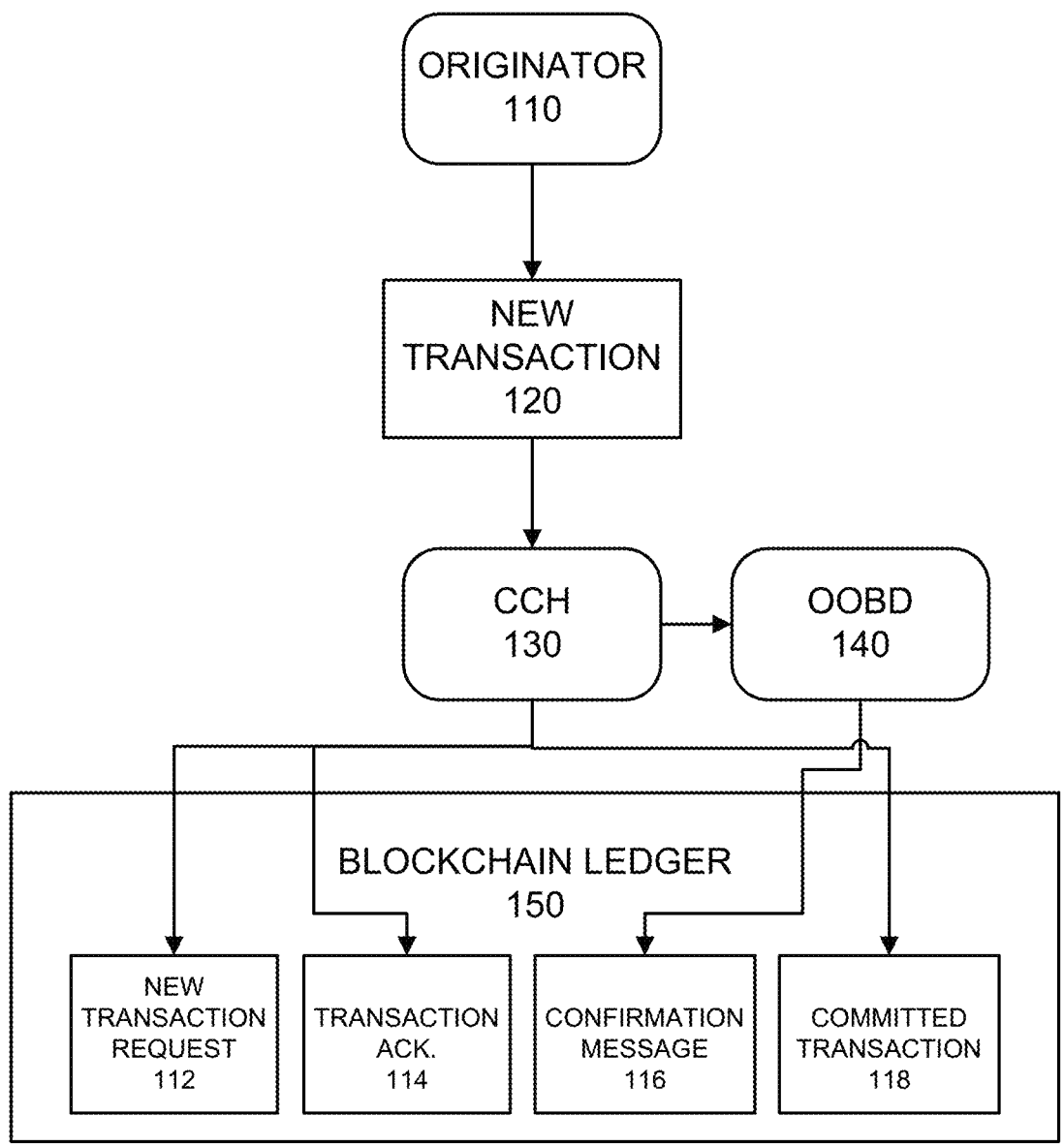
FIG. 1 illustrates an example of logging transaction information in a blockchain according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message.

The instant application relates to fraud prevention in a blockchain, and more particularly, to using out-of-band verification to reduce the likelihood of fraudulent transactions in the blockchain.

According to example embodiments, blockchain transactions may be combined with an out-of-band verification or authentication scheme which enables blockchain auditing and transactional fraud monitoring. In operation, a secure log on a distributed ledger permits appropriate access to information by all participants leveraging blockchain as a trusted "shadow ledger". Such a configuration also enables third party continuous auditing to identify and prevent unauthorized transactions. The out-of-band verification or authentication scheme permits confirmation of transactions by an authorized user even if the credentials or client systems to the primary transaction system (e.g., Central Clearing House (CCH)) have been compromised. Other features may include an optional secure out-of-band signing of transactions and analytics that detect fraud based on monitoring transactions and corresponding validations.

Each transaction is paralleled by confirmation transactions which are created as confirmations that identify the corresponding blockchain transactions. By providing ledger data related to the out-of-band verification or authentication scheme (including authentication/authorization data), an auditor may correctly identify fraudulent transactions when credentials to the CCH or corresponding transaction submission systems are compromised. In another embodiment an out-of-band verification or authentication scheme to use an out-of-band device to sign the transactions submitted to the CCH can be used. Automated auditing may be performed to flag unauthorized transactions in a systemic manner, even if client confirmation reports are compromised or there is fraudulent collusion.

Example embodiments also provide secure fraud detection analytics to identify anomalous behaviors including those that involve low-value transaction values not requiring out-of-band authorization. third party continuous auditing and monitoring may be performed by certain organizations by utilizing the audit procedures associated with the example embodiments. Transaction confirmations using out-of-band transaction authentication/authorization offer information that can be used to perform wide-scale analytics and identify likely events of fraud.

FIG. 1 illustrates an example of logging transaction information in a blockchain according to example embodiments. Referring to FIG. 1, a logic configuration 100 includes an originator 110 as a party that initiates a new blockchain transaction 120. A clearing house (CCH) 130 receives and processes the transactions adding to a ledger 150 for a new transaction request 112, a transaction acknowledgement 114 from an out-of-band device (OOBD) 140 and a committed transaction once confirmation is received 118. The OOBD 140 may be responsible for issuing a confirmation message that confirms a new transaction 116. Each transaction from the originator 110 is recorded in a blockchain 150 by a central clearing house CCH 130. A confirmation of the transaction is performed using the out-of-band verification device (OOBD) 140, which may include but is not limited to a smart phone, cell phone, tablet, desktop, laptop computer, and/or any device including a processor and memory. The OOBD 140 submits a corresponding blockchain entry which may be a sidechain, a separate blockchain or the same blockchain. The blockchain entries created by the CCH and OOBD are reconciled by a third party auditor. Any CCH transactions without corresponding OOBD transactions are flagged as potentially fraudulent and both the CCH and OOBD are notified by a notification procedure. In parallel, transaction profiling is performed by the third party auditor or a different third party based on the transactions posted to the blockchain. Anomalous and suspicious transactions are flagged as potentially fraudulent and both the CCH and OOBD are notified. Examples of suspicious behavior may include high volume of low value transactions (payments) to a particular party, or unfamiliar party or parties, high value payments to known suspicious entities, transactions at unusual times of the day or non-business days (e.g., holidays), multiple unsuccessful attempts to submit a transaction, incorrect payment instructions (e.g., misspellings), and the like.

A central clearing house may be a financial institution that provides clearing and settlement services for financial transactions, such as commodities derivatives, securities transactions, etc. The transactions may be executed on a futures exchange or securities exchange, as well as off-exchange in the over-the-counter (OTC) market. A clearing house is positioned between two clearing firms also known as member firms or clearing participants, and its purpose is to reduce the risk of one or more clearing firm failing to honor its trade settlement obligations. A clearing house reduces the settlement risks by netting offsetting transactions between multiple counterparties, by requiring collateral deposits, also called "margin deposits", by providing independent valuation of trades and collateral, by monitoring the credit worthiness of the clearing firms, and in many cases, by providing a guarantee fund that can be used to cover losses that exceed a defaulting clearing firm's collateral on a deposit. Once a trade has been executed by two counterparties either on an exchange, or in the OTC markets, the trade can be handed over to a clearing house, which then steps between the two original traders' clearing firms and assumes the legal counterparty risk for the trade.

The term 'out-of-band' may include any way of communicating outside of a current or established type of communication. In one example, verifying the identity of a person over an insecure communication system often requires communicating out-of-band via another method that is less vulnerable to the same kind of attack. One example may include checking for the use of a correct public key by confirming with that person prior to using that key to encrypt a communication. Out-of-band authentication (OOBA) is used when authentication requires two different signals from two different networks or channels. Out-of-band authentication may effectively block the common kinds of hacking and identity theft in online banking.

The third party auditor may be one or more of the blockchain members. The third party may also be one or more peers on the blockchain, a regulator, or contracted party to perform the auditing and fraud detection functions, etc. Each of those peers may perform only a subset of the auditing and/or fraud detection functions. The blockchain technology supports selective disclosure of information about the transactions. The entire transaction may be clear text, or encrypted so that only a subset of the blockchain participants, including an auditor or regulator, may view the transaction details. Similarly, selective parts of the transaction can be encrypted or hashed. Auditing of the transactions can be based on the encrypted or hashed values, or may use advance cryptographic techniques that have privacy preserving properties. Similarly, through the use of analytic techniques, the behavior modeling and anomaly detection can be performed on the same data and may use cryptographic techniques used by the auditing capabilities. According to example embodiments, there is a shared communication channel for the OOBD. The OOBD may establish a separate communication sub-channel over a SSL session. It is this sub-channel that establishes the out-of-band communication. In general, the communication channel for the OOBD communication channel may be separate from the communication channel used by the user or system that submitted the original transaction.

Figure 2:
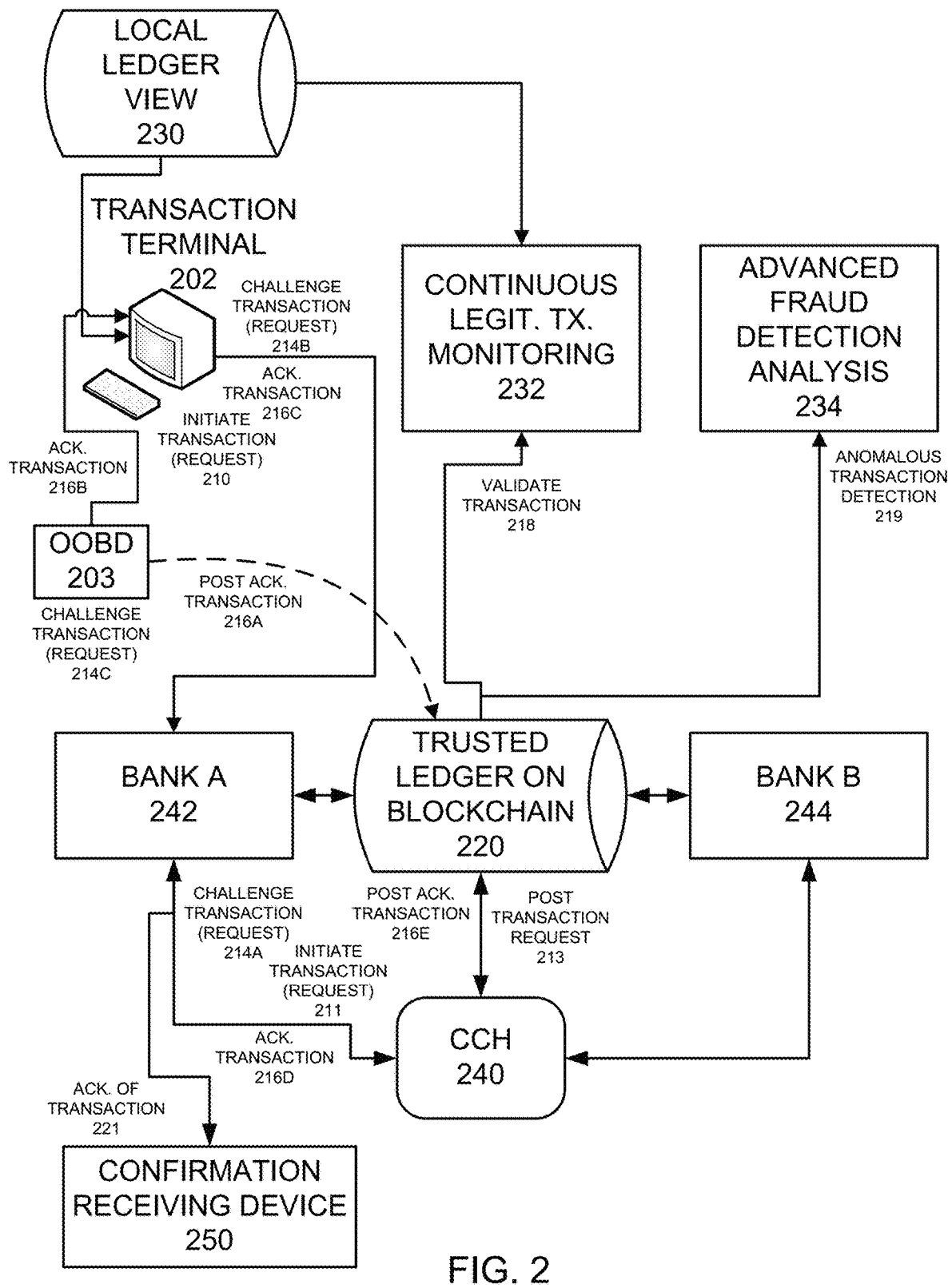
FIG. 2 illustrates a system configuration for processing a new transaction and validating the transaction with out-of-band verification according to example embodiments.

FIG. 2 illustrates a network system configuration for processing a new transaction and validating the transaction with out-of-band verification according to example embodiments. Referring to FIG. 2, a configuration 200 includes a transaction terminal 202 which may be any device initiating a transaction 210. In operation, transaction terminal 202 initiates a transaction request 210 to bank 'A' 242, which initiates a transaction request 211 to CCH 240. A local ledger 230 may be accessible for viewing ledger entries. CCH posts a transaction request 213 to the trusted ledger on a blockchain 220. The CCH sends a transaction challenge (request) 214A to bank A 242. Alternatively, CCH 240 sends a transaction challenge (request) 214A to OOBD 203 bypassing bank A 242 and transaction terminal 202. Continuing with the same example, bank A 242 sends a challenge transaction request 214B to OOBD 203, which posts a transaction acknowledgement (accept or reject the transaction) 216A to a trusted ledger on blockchain 220, which may be the same or a different blockchain that is used for recording the transaction request 213. The OOBD 203 posts an acknowledgement (accept or reject the transaction) 216C to bank A 242. Alternatively, OOBD 203 sends an acknowledgement (accept or reject the transaction) 216B to CCH 240, bypassing transaction terminal 202 and bank A 242, which posts an acknowledgement (accept or reject the transaction) 216D to CCH 240. The CCH 240 posts an acknowledgement (accept or reject the transaction) 216E to the trusted ledger on blockchain 220. CCH 240 processes the transaction per the acknowledgement 216D (accept or reject the transaction). The continuous legitimate transaction monitoring device/module 232 reads the transactions 213 from the trusted ledger on the blockchain 220 and the posted transaction acknowledgement (accept or reject the transaction) 216A from the trusted ledger on blockchain 220 and verifies that the transactions and acknowledgements match. If there is a mismatch, the transaction is flagged as a potential illegitimate transaction.

Validated transactions 218 on the blockchain 220 are sent 219 to advanced fraud detection analytics 234 (which may be hardware, firmware, and or software) to determine whether any of the transactions are fraudulent. Examples of fraud include, for example, repetitive transactions, IP addresses in remote locations, large monetary figures, etc. More than one bank 242/244 may be part of the third party auditing configuration. A confirmation receiving device 250 may confirm the acknowledgement 221 (accept or reject the transaction) of bank A 242. Once all the confirmations and acknowledgements are received, the committed transaction may be finalized and stored in the blockchain. The OOBD 203 confirmation messages may include information, such as a timestamp of the confirmation, identity of the person, device and/or service that confirmed the transaction, identification of the transaction being confirmed (e.g., transaction number, cryptographic hash of the transaction), and amount and/or parties involved in the transaction.

Each inter-institution transaction from an originator is sent to the central clearing house (CCH) 240, which records the transaction request in a blockchain ledger 220, and which confirms the transaction acknowledgment/or non-acknowledgment 216D. A callback from the CCH 240 is made to the originator's out-of-band device (OOBD) to confirm the transaction. The originator must acknowledge the validity of the transaction on the OOBD 203 to commit the transaction at the CCH 240. The OOBD 203 sends a confirmation to the CCH 240, which records the transaction acknowledgement in the blockchain and commits the transaction. The OOBD 203 may send a transaction confirmation message to the same blockchain or a sidechain/separate blockchain. If the transaction is recorded in a sidechain, this blockchain is stored at multiple different institutions to ensure integrity. A third party which is not the originator's institution and not the CCH 240, reconciles that the transactions recorded by the CCH 240 and reported by the OOBD 203 are consistent by determining the transaction recorded by the CCH 240 matches the transaction reported by OOBD 203.

If a transaction posted in the blockchain does not have a corresponding sidechain transaction then there may have been a system compromise or the transaction may be fraudulent. As a result, the CCH 240 and originating institutions are notified. The lack of match between a recorded confirmation and the recorded transaction would trigger a notification being made and sent to the originator and/or the OOBD 330. The CCH 310 may place a hold on the transaction until the discrepancy can be resolved. A third party that is different from the originator's institution and the CCH will monitor all posted transactions on the blockchain, use analytic techniques to build transaction behavior profiles to identify potentially suspicious behaviors and perform anomaly detection. In another embodiment, the originator's institution, the CCH, or any other entity described herein a confirmation request 332 may be sent to the OOBD and the transaction may be verified 334 by comparing the transaction 336 to the confirmation and if there is a mismatch 338, a notification is created and sent 342 to the OOBD and/or the CCH, can perform the monitoring. The originator, OOBC and/or CCH may cryptographically process the entire message or various parts to protect the privacy of the originator and/or the recipient.

According to other example embodiments, the party performing the role of the auditor may be one or more of the blockchain members. Any transactions which do not have a matching confirmation may be flagged and any CCH transactions without corresponding OOBD transactions may be marked as potentially fraudulent. This results in notifying both the CCH and OOBD performing, in parallel, transaction profiling by a third party, which may be one or more peers on the blockchain, a regulator, or contracted party to perform the auditing and fraud detection functions based on the transactions posted to the blockchain flagging anomalous and suspicious transactions as potential fraud and notifying both the CCH and OOBD.

Figure 3:
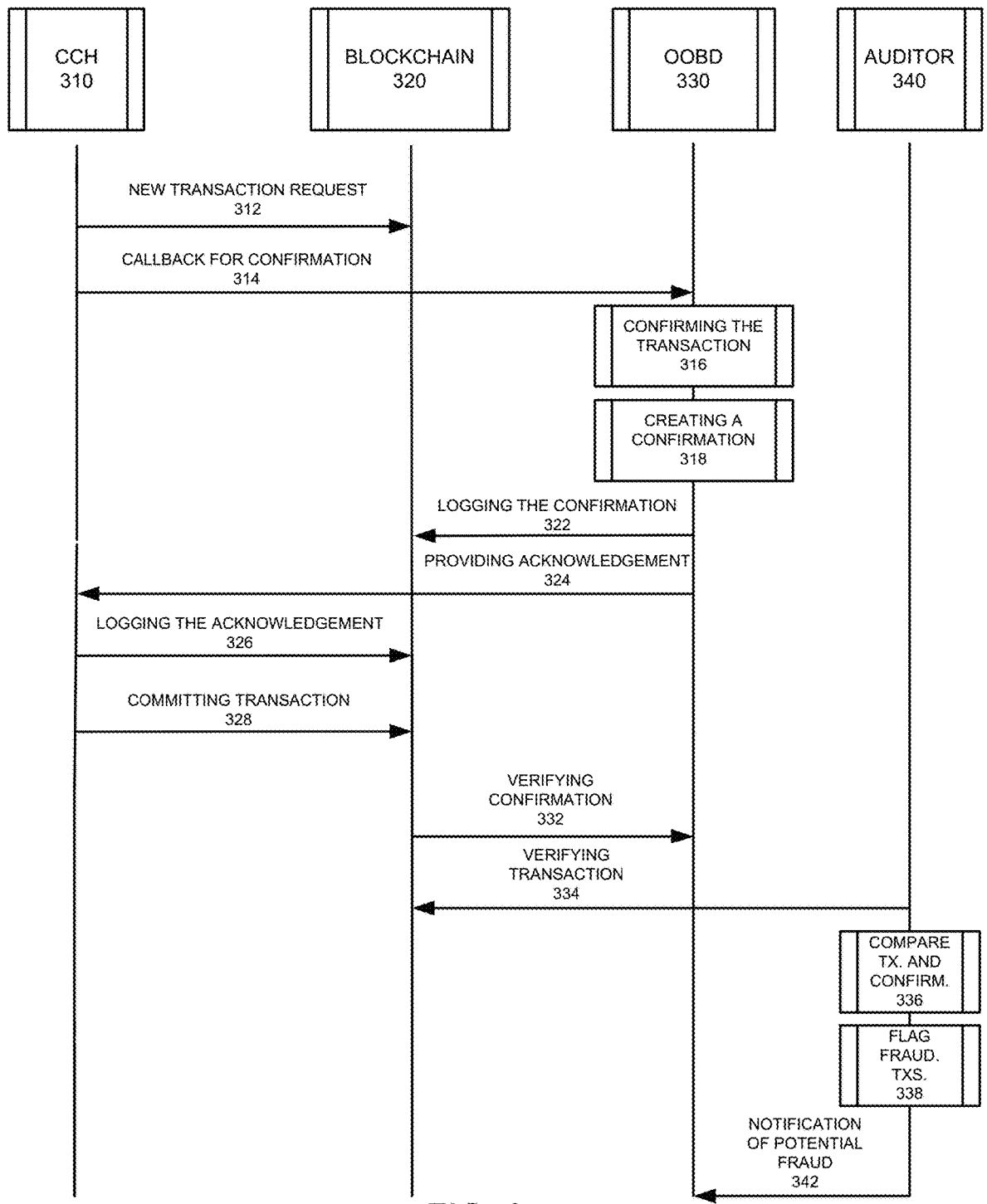
FIG. 3 illustrates a system signaling diagram of processing a new transaction and validating the transaction with out-of-band verification according to example embodiments.

FIG. 3 illustrates a system signaling diagram of processing a new transaction and validating the transaction with out-of-band verification according to example embodiments. Referring to FIG. 3, the system configuration 300 includes four entities including a CCH 310, a blockchain 320, an OOBD 330 and an auditor 340. In operation, a new transaction request 312 may be received and stored in the blockchain 320. A callback for confirmation 314 may be generated and sent to the OOBD 330. The OOBD may confirm a transaction 316, create a confirmation 318 and forward a confirmation 322 to the blockchain 320. An acknowledgement 324 may be sent to the CCH 310 which then logs an acknowledgement 326 in the blockchain 320. Then, the blockchain transaction may be committed 328 to the blockchain 320. The auditor reads the transaction and verification from the OOBD from the blockchain and correlates the two pieces of information, as each transaction has a corresponding verification, to verify that the transaction has a corresponding verification. A confirmation request 332 may be sent to the OOBD and the transaction may be verified 334 by comparing the transaction 336 to the confirmation and if there is a mismatch 338, a notification is created and sent 342 to the OOBD and/or the CCH.

Figure 4A:
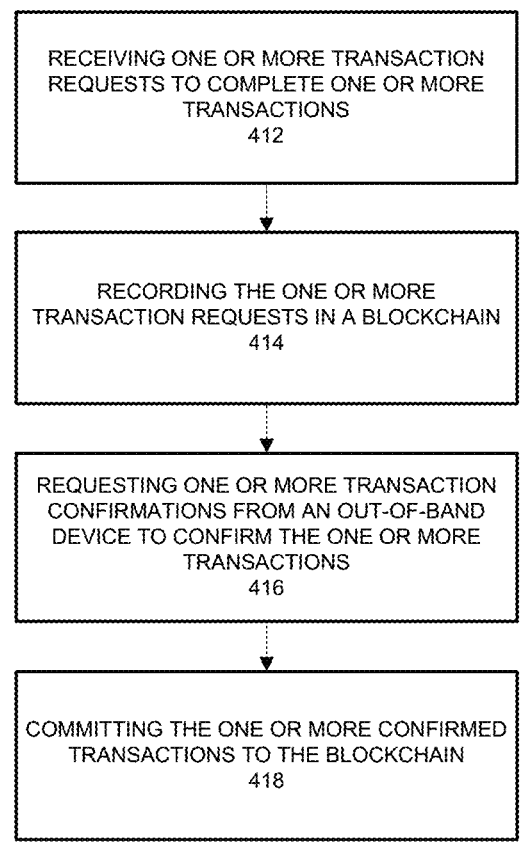
FIG. 4A illustrates a flow diagram of an example method of processing a blockchain transaction according to example embodiments.

FIG. 4A illustrates a flow diagram 400 of an example method of processing a blockchain transaction according to example embodiments. The method may include one or more of receiving one or more transaction requests to complete one or more transactions 412, recording the one or more transaction requests in a blockchain 414, requesting one or more transaction confirmation from an out-of-band device to confirm the one or more transactions 416, and committing the one or more transaction confirmations to the blockchain 418. The method may also include transmitting a callback to the out-of-band device to confirm the one or more transactions, receiving one or more acknowledgements corresponding to the one or more confirmations, and recording the one or more acknowledgements in the blockchain. The one or more confirmations corresponding to the one or more transactions may be recorded in a different blockchain than the blockchain. The method may also include recording in the blockchain one or more confirmations corresponding to the one or more transactions received from the out-of-band device. The method may further include comparing the one or more confirmations to the one or more committed transactions, determining whether the one or more confirmations and the one or more committed transactions match, and when the one or more confirmations does not match the one or more committed transactions, flagging any unmatched transaction. The method may also include creating a notification based on the unmatched transaction, and transmitting the notification to the out-of-band device and an originator device of a transaction originator of the unmatched transaction.

Figure 4B:
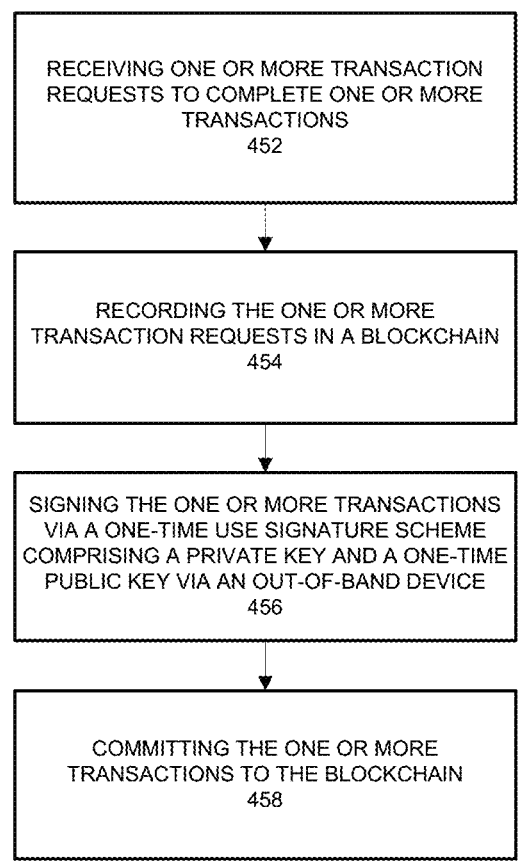
FIG. 4B illustrates a flow diagram of another example method of processing a blockchain transaction according to example embodiments.

FIG. 4B illustrates a flow diagram 450 of another example method of processing a blockchain transaction according to example embodiments. The method may include one or more of receiving one or more transaction requests to complete one or more transactions 452, recording the one or more transaction requests in a blockchain 454, signing the one or more transactions via a one-time use signature scheme comprising a private key and a one-time public key via an out-of-band device 456, and committing the one or more transactions to the blockchain 458.

In this example embodiment, a one-time use signature scheme can be combined with a Merkle hash tree construction so that a single overall public key can represent multiple underlying one-time use public keys. Additionally, an out-of-band device can perform the one-time signing operation on each transaction via the one-time key. Alternatively, the one-time use private keys can likewise be derived from a single overall private key. In such implementations, an individual signature may be associated with context information and/or an index value that specifies which underlying one-time use public/private key pair is involved in a signature. For example, in a cryptocurrency system, the context information may include a transaction number or identifier, so that multiple transactions can be associated with the same overall public key (e.g., from which a cryptocurrency address may be derived), yet each one signed with a separate underlying private key. The context information may comprise the current time interval, e.g., each underlying one-time use key pair in the Merkle tree is associated with a different time interval. The context information may also be part of the signature itself and the counter may be included in the signature or transaction. A device in receipt of the transaction can check that the context information in the signature or transaction it receives from the out-of-band device is the correct "next" value based on the previous transaction of the out-of-band device in a transaction log.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent or be integrated in any of the above-described components, etc.

Figure 5:
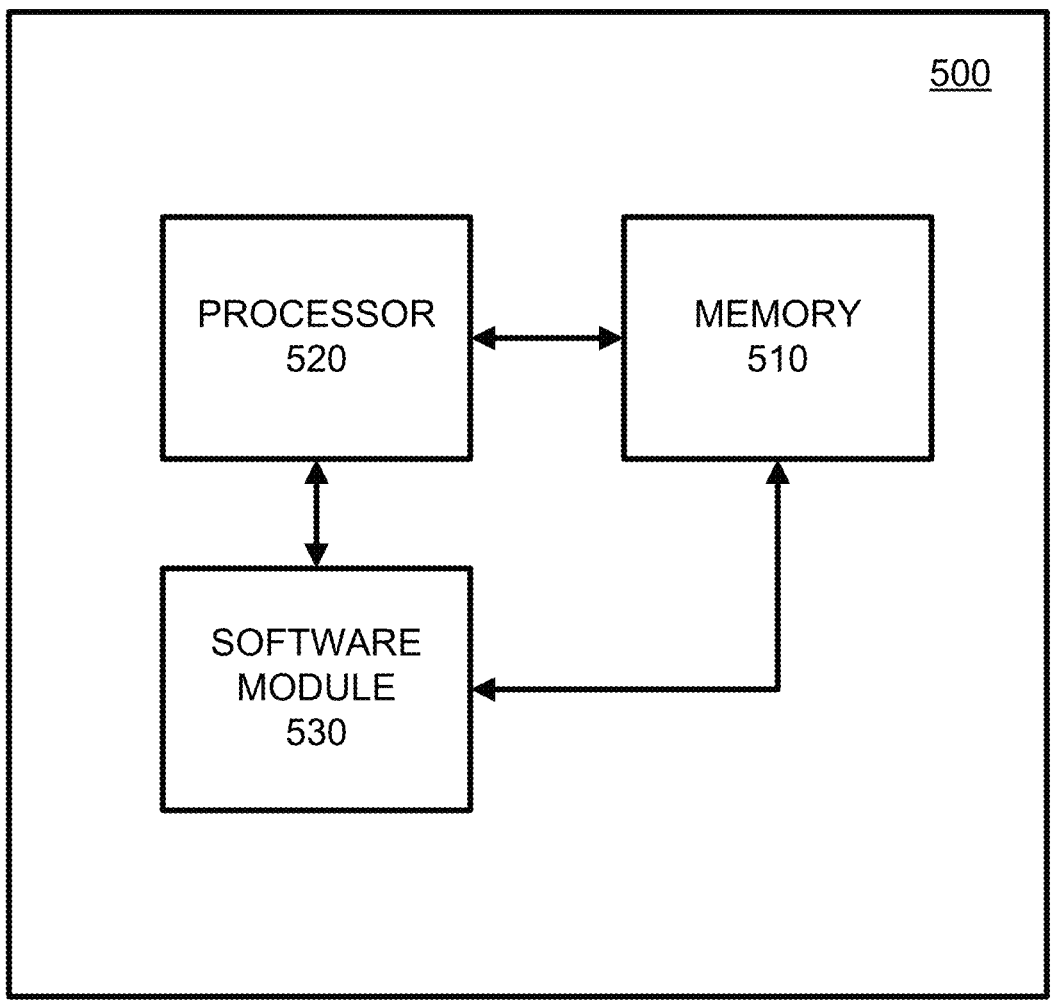
FIG. 5 illustrates an example network entity configured to support one or more of the example embodiments.

As illustrated in FIG. 5, a memory 510 and a processor 520 may be discrete components of a network entity 500 that are used to execute an application or set of operations as described herein. The application may be coded in software in a computer language understood by the processor 520, and stored in a computer readable medium, such as, a memory 510. The computer readable medium may be a non-transitory computer readable medium that includes tangible hardware components, such as memory, that can store software. Furthermore, a software module 530 may be another discrete entity that is part of the network entity 500, and which contains software instructions that may be executed by the processor 520 to effectuate one or more of the functions described herein. In addition to the above noted components of the network entity 500, the network entity 500 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method implemented by a computing system, the method comprising:
   receiving, by an out-of-band device (OOBD), a confirmation request sent from a central clearing house (CCH), the confirmation request being associated with a transaction request, sent from the CCH to a blockchain, to complete a transaction, where the transaction request is sent via a first communication channel, and the confirmation request is sent via a second communication channel that is different from the first communication channel;
   sending, by the OOBD, a confirmation of the transaction to the blockchain via the second communication channel;
   sending, by the OOBD using the second communication channel, an acknowledgment of the confirmation to the CCH, the acknowledgment prompting the CCH to commit the transaction to the blockchain using the first communication channel; and
   receiving, by the OOBD, a notification of potential fraud from an auditor device based on a comparison of the transaction to at least one of the confirmation and one or more committed transactions.

2. The method of claim 1, further comprising:
   receiving, by the OOBD, a callback from the CCH to confirm the transaction.

3. The method of claim 1, further comprising:
   storing the confirmation of the transaction in another blockchain.

4. An out-of-band device (OOBD) in a blockchain network, the OOBD comprising:
   a receiver configured to:
      receive a confirmation request sent from a central clearing house (CCH), the confirmation request being associated with a transaction request, sent from the CCH to a blockchain, to complete a transaction, where the transaction request is sent via a first communication channel, and the confirmation request is sent via a second communication channel that is different from the first communication channel; and
   a processor configured to:

control the OOBD to send a confirmation of the transaction to the blockchain via the second communication channel;

control the OOBD to send, using the second communication channel, an acknowledgment of the confirmation to the CCH, the acknowledgment prompting the CCH to commit the transaction to the blockchain using the first communication channel; and control the OOBD to receive a notification of potential fraud from an auditor device based on a comparison of the transaction to at least one of the confirmation and one or more committed transactions.

5. The OOBD of claim 4, wherein the processor is configured to:

control the OOBD to receive a callback from the CCH to confirm the transaction.

6. The OOBD of claim 4, wherein the processor is further configured to:

control the OOBD to store the confirmation of the transaction in another blockchain.

7. A non-transitory computer readable storage medium storing one or more instructions that when executed by a processor cause the processor to perform:

receiving, by an out-of-band device (OOBD), a confirmation request sent from a central clearing house (CCH), the confirmation request being associated with a transaction request, sent from the CCH to a blockchain, to complete a transaction, where the transaction request is sent via a first communication channel, and the confirmation request is sent via a second communication channel that is different from the first communication channel;

sending, by the OOBD, a confirmation of the transaction to the blockchain via the second communication channel;

sending, by the OOBD using the second communication channel, an acknowledgment of the confirmation to the CCH, the acknowledgment prompting the CCH to commit the transaction to the blockchain using the first communication channel; and receiving, by the OOBD, a notification of potential fraud from an auditor device based on a comparison of the transaction to at least one of the confirmation and one or more committed transactions.

8. The non-transitory computer readable storage medium of claim 7, wherein the one or more instructions are further configured to cause the processor to perform:

receiving, by the OOBD, a callback from the CCH to confirm the transaction.

9. The non-transitory computer readable storage medium of claim 7, wherein the confirmation of the transaction is stored in another blockchain.

* * * * *